United States Patent [19]

Lenart

[11] Patent Number: 5,468,152
[45] Date of Patent: Nov. 21, 1995

[54] EDUCATIONAL CHILDREN'S CLOTHING

[76] Inventor: Mary K. Lenart, 6250 Cloverly Dr., Solon, Ohio 44139

[21] Appl. No.: 312,664

[22] Filed: Sep. 27, 1994

Related U.S. Application Data

[63] Continuation of Ser. No. 44,985, Apr. 7, 1993, abandoned.
[51] Int. Cl.⁶ .................................................. G09B 25/00
[52] U.S. Cl. ........................ 434/429; 2/75; 2/80; 2/247
[58] Field of Search ................................ 434/429, 395, 434/99; 2/75, 80, 247, 84, 79, 69

[56] References Cited

U.S. PATENT DOCUMENTS

| | | | |
|---|---|---|---|
| 2,530,453 | 11/1950 | Eagle | 2/247 |
| 3,447,165 | 6/1969 | Brosk | 2/75 |
| 3,624,686 | 11/1971 | Beals | 2/48 X |
| 3,724,101 | 4/1973 | Slezak . | |
| 3,775,775 | 12/1973 | Mazzenga | 2/80 |
| 4,138,745 | 2/1979 | Greenspan | 2/247 |
| 4,253,197 | 3/1981 | Posta | 2/69 |
| 4,378,214 | 3/1983 | Scherer . | |
| 4,404,689 | 9/1983 | DeWan | 2/247 |
| 4,519,781 | 5/1985 | Boyd . | |
| 4,636,172 | 1/1987 | Fredericks . | |
| 4,710,979 | 12/1987 | Bull et al. | 2/48 |
| 4,723,323 | 2/1988 | Wright, Jr. | 2/49 R |
| 5,210,881 | 3/1993 | Stocker, Jr. et al. | 2/75 X |

FOREIGN PATENT DOCUMENTS 359862  4/1906  France ................................ 434/395

*Primary Examiner*—Paul J. Hirsch
*Attorney, Agent, or Firm*—Calfee, Halter & Griswold

[57] ABSTRACT

The present invention relates to an article of children's clothing for teaching the child an educational concept, wherein the article of clothing is a garment having a plurality of pockets, each of said pockets displaying at least one member of the educational concept and containing an object displaying at least one member of the educational concept. The educational concepts to be taught to the child include the alphabet, geometry, the number system, color, modes of transportation, nature, and zoology.

20 Claims, 2 Drawing Sheets

1

EDUCATIONAL CHILDREN'S CLOTHING

This is a continuation of application Ser. No. 08/044,985, filed on Apr. 7, 1993, now abandoned.

FIELD OF THE INVENTION

The present invention relates generally to an article of clothing and, more particularly, to an article of children's clothing having a plurality of pockets which display and contain members of an educational concept.

BACKGROUND OF THE INVENTION

Articles of clothing such as capes, bibs, and aprons have been used to teach young children numbers, the alphabet, and geometric shapes. U.S. Pat. No. 3,624,686 to Beals discloses an apron to be worn by a teacher, the apron having a number of pockets of different colors removably attached to the apron. Color identification is taught to young children by the teacher placing articles of a matching color into a pocket while the children observe.

U.S. Pat. No. 3,724,101 to Slezak discloses a cape having a number of pockets on the front of the cape, each pocket displaying a different consonant of the alphabet. Inside each pocket is an object which corresponds to the consonant of the pocket. Detachable patches displaying the vowels of the alphabet are attached to the front of the cape. The cape is worn by a teacher and is used to teach the spelling of words.

U.S. Pat. No. 4,710,979 to Bull et al. discloses an apron to be worn by an adult for interactive play with a young child. The apron has a number of two-dimensional appliques for attachment and detachment by the child. The appliques include the letters of the alphabet, a variety of fastening devices, and toys that make sounds.

U.S. Pat. No. 4,723,323 to Wright, Jr. discloses a child's activity bib which is designed to be worn by an adult while the child is held on the lap of the adult facing the activity bib. The activity bib has a number of activity means mounted on the front of the bib. These activity means may include a color activity, a texture activity, a shape activity, a number activity, and a pocket activity.

The articles of clothing described above are designed to be worn by an adult for instructive play with children. The present invention is directed to articles of clothing for young children to wear. Not only are the articles of clothing of the present invention functional as everyday durable and washable children's clothing, they also serve the purpose of instructing young children in a number of educational concepts including, but not limited to, the alphabet, geometry, the number system, color, modes of transportation, nature, and zoology. Accordingly, it is an object of the present invention to provide educational children's clothing that will increase a child's vocabulary, aid a child in identifying common objects, and facilitate a child's interaction with others.

SUMMARY OF THE INVENTION

The present invention relates to an article of clothing worn by a child for teaching the child an educational concept, the article of clothing comprising a garment having a plurality of pockets, each of the pockets displaying at least one member of the educational concept and containing an object displaying at least one member of the educational concept.

DETAILED DESCRIPTION OF THE INVENTION

Figure 1B:
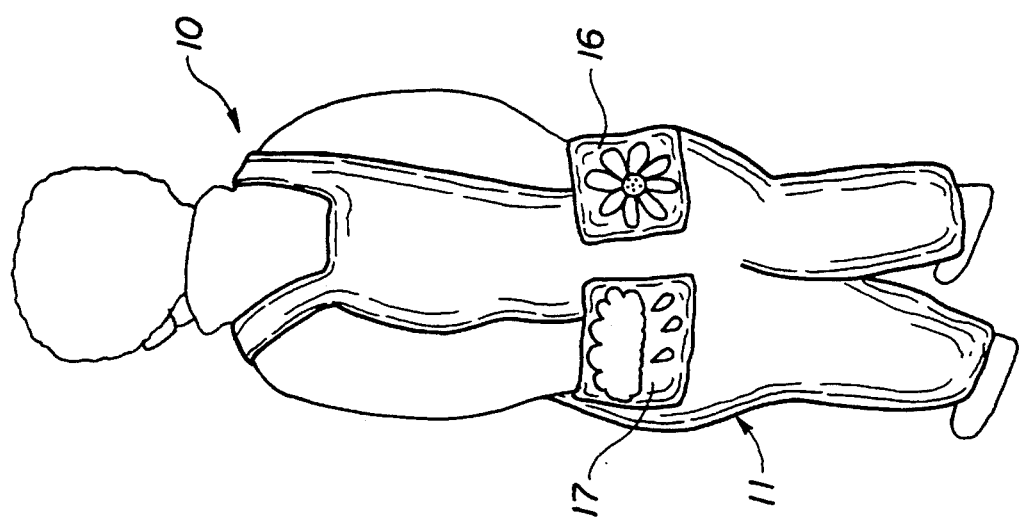
FIG. 1B is a back view of the overall of FIG. 1A.
Figure 1A:
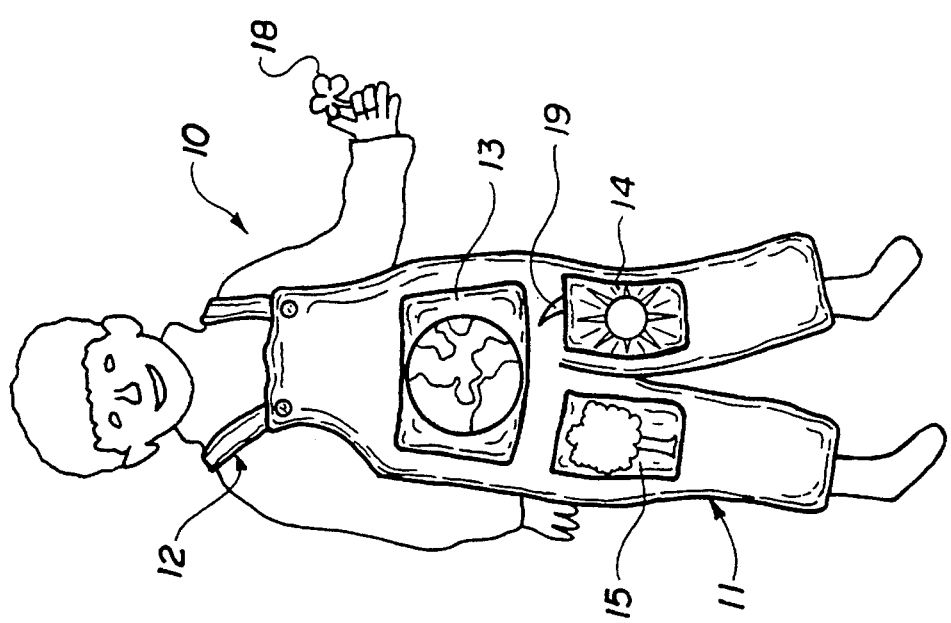
FIG. 1A is a front view of an overall displaying a nature theme.

The educational children's clothing of the present invention is referred to generally in FIG. 1A and FIG. 1B by the reference numeral 10. The embodiment of the present invention shown in FIGS. 1A and 1B is in the style of an overall 11 having shoulder straps 12 to secure the overall on the child. Overall 11 has a pocket 13 located on the upper front of overall 11. Pockets 14 and 15 are located on each of the upper legs of overall 11. As shown in FIG. 1B, overall 11 has pockets 16 and 17 located on the back of overall 11 above each leg. On the outside of each of pockets 13 to 17 may be appliqued a member or members of an educational concept such as letters of the alphabet, numerals, geometric shapes, symbols of nature, animal figures, and transportation vehicles. In the embodiment shown in FIGS. 1A and 1B, symbols of nature are appliqued to the outside of each of pockets 13 to 17.

The educational concept displayed on the garment can be selected from a number of themes to stimulate the child's interest and challenge and expand the child's vocabulary. The members of the educational concept are consistent with the theme of the educational concept. For example, if the educational concept is zoology, the pockets and objects found in the pockets may display domestic animals that could be found on a farm, wild animals that could be found in a zoo, or animals that are in danger of extinction. In another embodiment of the invention, the educational concept is modes of transportation and the members comprise a bus, a car, a truck, a train, an airplane, a bicycle, a motorcycle, and a boat. Pockets 13 to 17 display members of only one educational concept.

Figure 2:
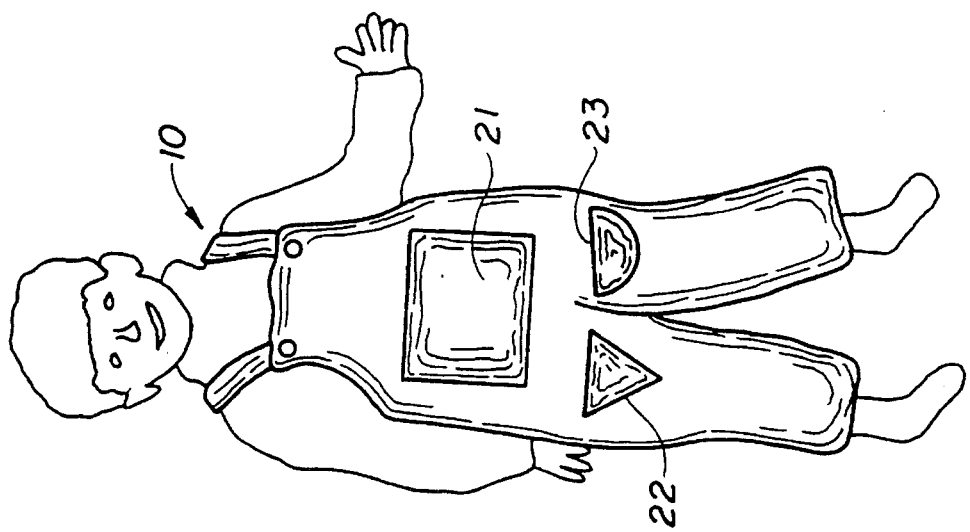
FIG. 2 is a front view of an overall displaying a geometry theme and having shaped pockets.

Each of pockets 13 to 17 may also be in the shape of a member of an educational concept, rather than have such member of an educational concept appliqued on the pocket. For example, as shown in FIG. 2, pockets 21 to 23 are in the form of geometric shapes. The geometric shapes may include a square, a rectangle, a triangle, a circle, an oval, a pentagon, a hexagon, an octagon, or a semi-circle.

Further, each of pockets 13 to 17 contains an object 18, 19 in the shape of a member of the educational concept displayed on the pockets. For example, if the educational concept displayed on the pockets is nature, the objects inside the pockets may be in the form of the sun, a cloud, a flower, a tree, a rain drop, the earth, wind, the sea, or any other symbol of nature. Object 18, 19 can be removed from its pocket by the child.

Figure 3:
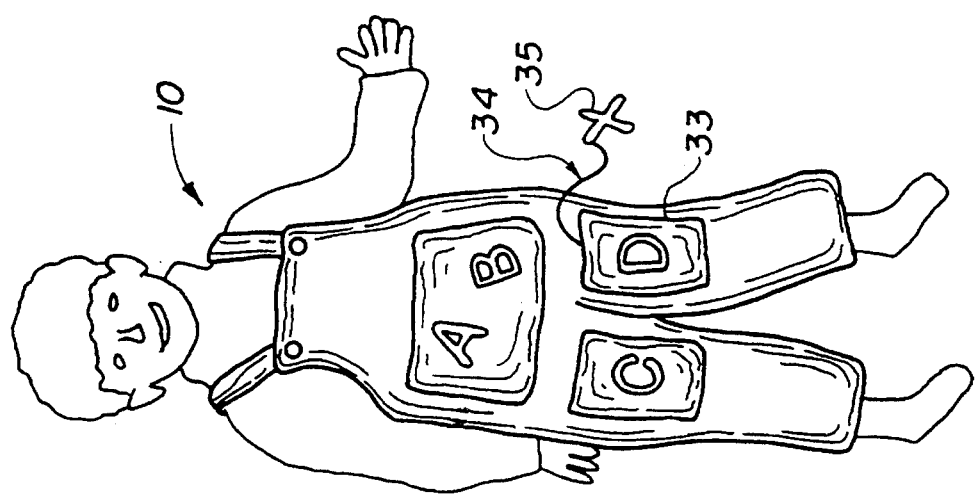
FIG. 3 is a front view of an overall displaying an alphabet theme and having an object secured thereto.

The specific materials from which the objects are constructed may be varied. The objects may be constructed from fabric, plastic, or any other material that is washable. Preferably, the objects are constructed from a material that is machine washable. The objects may also be secured to the inside or outside of the pockets so that each object can be removed by the child from the pocket, but not lost or misplaced by the child. As shown in FIG. 3, securing the object to the pocket may be accomplished, for example, by attaching one end of a string 34 to an object 35 and the other end to a pocket 33.

Figure 4:
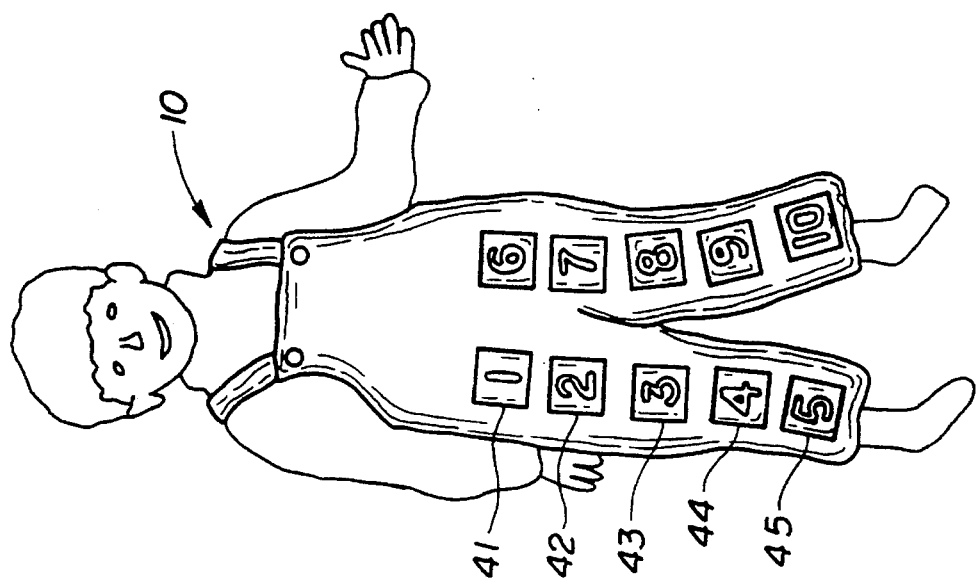
FIG. 4 is a front view of an overall displaying a number system theme.

The article of clothing of the present invention may have more than three pockets on the front of the article and more than two pockets on the back of the article. As shown in FIG. 4, overall 11 has five pockets 41–45 on each leg.

Figure 5:
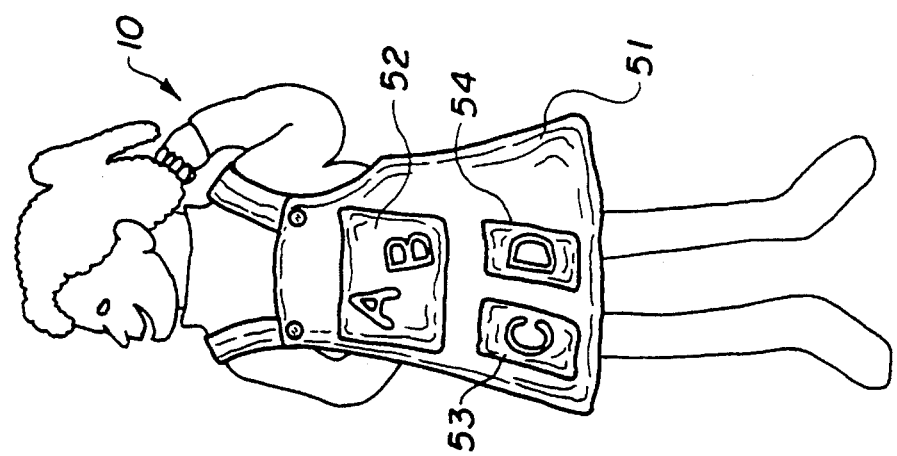
FIG. 5 is a front view of a jumper displaying the alphabet theme.

The article of clothing of the present invention is not limited to a unisex overall as shown in FIGS. 1A to 4. Rather, the present invention contemplates an article of children's clothing having a plurality of pockets displaying members of an educational concept and containing objects representing additional members of the educational concept. FIG. 5 shows another embodiment of the present invention wherein the article of clothing is in the style of a girl's jumper. Pockets 52–54 of jumper 51 display members of the educational concept of the alphabet. Other garments such as trousers, skirts, and jackets are also contemplated by the present invention.

The invention is not limited to the embodiments which have just been described and it is intended by the following claims to include all equivalent means which come within the full scope and true spirit of the invention.

What is claimed is:

1. An article of clothing worn by a child for learning an educational concept having a plurality of members consistent with a theme of said educational concept, said article of clothing comprising a garment to be worn by a child having a plurality of pockets, each of said pockets displaying at least one member of said educational concept and containing a removable object displaying at least one member of said educational concept, and each of said removable objects is secured to one of said pockets to prevent disassociation of said objects from said garment.

2. The article of clothing of claim 1 wherein said educational concept is selected from the group consisting of: the alphabet, geometry, the number system, color, modes of transportation, nature, and zoology.

3. The article of clothing of claim 1 wherein each of said educational concept comprises zoology and said members of said educational concept comprise domestic animals found on a farm, wild animals found in a zoo, or endangered animals.

4. The article of clothing of claim 1 wherein said garment comprises an overall or jumper.

5. The article of clothing of claim 1 wherein said educational concept comprises the alphabet and said members of said educational concept comprise the letters of the alphabet.

6. The article of clothing of claim 1 wherein said educational concept comprises geometry and said members of said educational concept comprise a square, a circle, a triangle, a rectangle, an oval, a pentagon, a hexagon, an octagon, and a semi-circle.

7. The article of clothing of claim 1 wherein said educational concept comprises modes of transportation and said members of said educational concept comprise a bus, a car, a truck, a train, an airplane, a bicycle, a motorcycle, and a boat.

8. The article of clothing of claim 1 wherein said educational concept comprises nature and said members of said educational concept comprise the sun, the earth, a flower, a tree, a cloud, a rain drop, wind, and the sea.

9. An article of clothing worn by a child for learning an educational concept having a plurality of members consistent with a theme of said educational concept, said article of clothing comprising a overall to be worn by a child having a plurality of pockets, each of said pockets displaying at least one member of said educational concept and containing a removable object displaying at least one member of said educational concept, and each of said removable objects is secured to one of said pockets to prevent disassociation of said objects from said garment.

10. An article of clothing worn by a child for learning an educational concept having a plurality of members consistent with a theme of said educational concept, said article of clothing comprising an jumper to be worn by a child having a plurality of pockets, each of said pockets displaying at least one member of said educational concept and containing a removable object displaying at least one member of said educational concept, and each of said removable objects is secured to one of said pockets to prevent disassociation of said objects from said garment.

11. An article of clothing worn by a child for learning an educational concept having a plurality of members consistent with a theme of said educational concept, said article of clothing comprising a garment to be worn by a child having a plurality of pockets, each of said pockets displaying at least one member of said educational concept, wherein said member is secured to an outside portion of said garment to prevent disassociation of said member from said garment, and containing a removable object displaying at least one member of said educational concept.

12. An article of clothing worn by a child for learning an educational concept having a plurality of first and second members consistent with a theme of said educational concept, said article of clothing comprising a garment to be worn by a child having a plurality of pockets, each of said pockets displaying at least one first member of said educational concept, wherein said first member is secured to an outside portion of said garment to prevent disassociation of said member from said garment, and containing a removable object displaying at least one second member of said educational concept.

13. The article of clothing of claim 11 or 12 wherein said educational concept is selected from the group consisting of: the alphabet, geometry, the number system, color, modes of transportation, nature, and zoology.

14. The article of clothing of claim 11 or 12 wherein each of said removable objects is secured to one of said pockets to prevent disassociation of said object from said garment.

15. The article of clothing of claim 11 wherein said garment comprises an overall or jumper.

16. The article of clothing of claim 11 wherein said educational concept comprises the alphabet and said members of said educational concept comprise the letters of the alphabet.

17. The article of clothing of claim 11 wherein said educational concept comprises geometry and said members of said educational concept comprise a square, a circle, a triangle, a rectangle, an oval, a pentagon, a hexagon, an octagon, and a semi-circle.

18. The article of clothing of claim 11 wherein said educational concept comprises modes of transportation and said members of said educational concept comprise a bus, a car, a truck, a train, an airplane, a bicycle, a motorcycle, and a boat.

19. The article of clothing of claim 11 or 12, wherein said educational concept comprises nature and said members of said educational concept comprise the sun, the earth, a flower, a tree, a cloud, a rain drop, wind, and the sea.

20. The article of clothing of claim 11 or 12, wherein said educational concept comprises zoology and said members of said educational concept comprise domestic animals found on a farm, wild animals found in a zoo, or endangered animals.

\* \* \* \* \*